(12) United States Patent
Heusch

(10) Patent No.: US 9,892,586 B2
(45) Date of Patent: Feb. 13, 2018

(54) HAND-HELD DEVICE AND METHOD FOR AUTHENTICATING A MARKING

(71) Applicant: SICPA HOLDING SA, Prilly (CH)

(72) Inventor: Guillaume Heusch, Lausanne (CH)

(73) Assignee: SICPA Holding SA, Prilly (CH)

( * ) Notice: Subject to any disclaimer, the term of this patent is extended or adjusted under 35 U.S.C. 154(b) by 39 days.

(21) Appl. No.: 15/028,209

(22) PCT Filed: Oct. 10, 2014

(86) PCT No.: PCT/EP2014/071765
§ 371 (c)(1),
(2) Date: Apr. 8, 2016

(87) PCT Pub. No.: WO2015/052318
PCT Pub. Date: Apr. 16, 2015

(65) Prior Publication Data
US 2016/0253857 A1    Sep. 1, 2016

Related U.S. Application Data

(60) Provisional application No. 61/889,779, filed on Oct. 11, 2013.

(51) Int. Cl.
*G06K 9/00* (2006.01)
*G07D 7/12* (2016.01)
(Continued)

(52) U.S. Cl.
CPC ........... *G07D 7/122* (2013.01); *G07D 7/1205* (2017.05); *H04N 7/185* (2013.01)

(58) Field of Classification Search
CPC ............... G06K 9/00; H04N 7/00; G07D 7/00
(Continued)

(56) References Cited

U.S. PATENT DOCUMENTS

| 4,204,765 A | 5/1980 | Iannadrea et al. |
| 4,705,300 A | 11/1987 | Berning et al. |

(Continued)

FOREIGN PATENT DOCUMENTS

| DE | 10208036 | 8/2003 |
| EP | 0227423 | 6/1992 |

(Continued)

OTHER PUBLICATIONS

Denis Oberkampf et al. "Iterative Pose Estimation Using Coplanar Feature Points", Computer Vision and Image Understanding, vol. 63, May, pp. 495-511, 1996.

(Continued)

*Primary Examiner* — Abolfazl Tabatabai
(74) *Attorney, Agent, or Firm* — Muncy, Geissler, Olds & Lowe, P.C.

(57) ABSTRACT

A hand-held device for authenticating a marking on an object, said marking exhibiting a viewing-angle dependent light reflection spectrum. The device includes an imager for receiving light from said object and generating image data that include spectrum information, a marking detector for detecting marking image data associated with said marking in said image data, a parameter evaluator for determining a value of a predetermined spectrum parameter based on spectrum information of at least a part of said marking image data, an angle estimator for determining a value of a viewing angle between said imager and said marking associated with a determined value of said spectrum parameter, and an authenticator arranged for making an authentication decision based on at least two spectrum parameter values and their associated viewing angle values.

16 Claims, 4 Drawing Sheets

(51) Int. Cl.
*H04N 7/18* (2006.01)
*G07D 7/1205* (2016.01)
*B05C 1/16* (2006.01)

(58) Field of Classification Search
USPC ............ 382/137, 313, 321; 235/375, 462.45, 235/472.01; 427/137
See application file for complete search history.

(56) References Cited

U.S. PATENT DOCUMENTS

| | | | |
|---|---|---|---|
| 4,705,356 A | 11/1987 | Berning et al. | |
| 4,721,217 A | 1/1988 | Phillips et al. | |
| 4,779,898 A | 10/1988 | Berning et al. | |
| 4,930,866 A | 6/1990 | Berning et al. | |
| 5,084,351 A * | 1/1992 | Philips | B05D 1/286 156/289 |
| 5,607,504 A | 3/1997 | Schmid et al. | |
| 5,624,486 A * | 4/1997 | Schmid | A61Q 1/02 106/31.65 |
| 5,807,497 A * | 9/1998 | Gailberger | C09B 67/0098 106/493 |
| 5,824,733 A | 10/1998 | Dobert et al. | |
| 2003/0173539 A1 | 9/2003 | Rees et al. | |
| 2006/0204145 A1 | 9/2006 | Vasic et al. | |
| 2011/0164805 A1 | 7/2011 | Blair et al. | |
| 2011/0317150 A1 | 12/2011 | Decoux et al. | |
| 2012/0175412 A1 | 7/2012 | Grabiner et al. | |
| 2012/0269402 A1 | 10/2012 | Souparis | |

FOREIGN PATENT DOCUMENTS

| | | |
|---|---|---|
| EP | 0899119 | 12/2001 |
| GB | 2403798 | 1/2005 |
| WO | 2001054077 | 7/2001 |
| WO | 2009121605 | 10/2009 |

OTHER PUBLICATIONS

Georgian office action in counterpart Georgian Application No. AP 2014 014139 dated Feb. 2, 2017 (and English language translation).

* cited by examiner

HAND-HELD DEVICE AND METHOD FOR AUTHENTICATING A MARKING

CROSS-REFERENCE TO RELATED APPLICATIONS

The present application is a National Stage Application of International Application No. PCT/EP2014/071765 filed Oct. 10, 2014, which published as WO 2015/052318 A1 on Apr. 16, 2015, the disclosures of which are expressly incorporated by reference herein in their entireties. Further, the present application claims the benefit of U.S. Provisional Application No. 61/889,779 filed Oct. 11, 2013, the disclosure of which is expressly incorporated by reference herein in its entirety.

BACKGROUND OF THE DISCLOSURE

1. Field of the Disclosure

The present application relates to a hand-held device and method for authenticating a marking on an object, said marking exhibiting a viewing-angle dependent light reflection spectrum.

2. Background Description

Security documents and valued goods can be marked with materials exhibiting particular physical or chemical properties (security features), which serve to authenticate the marked items through a detection of the presence of said properties.

A common way to mark a security document or a valued good comprises the incorporation of one or more marking materials into a printing ink or a coating composition, which is subsequently applied to said document or good, if needed in the form of indicia. Alternative ways to mark an article comprise the incorporation of one or more marking materials into the bulk (plastic, paper, liquid, etc.) of the article.

Among markings of this kind are markings exhibiting a viewing-angle dependent light reflection spectrum ("optically variable devices", OVDs), which, e.g., are used as efficient anti-copy devices on bank notes and security documents. Among the OVDs, optically variable inks (OVI®; EP 227,423 B1) have acquired a preeminent position since their first introduction on currency back in 1987. Such inks can be formulated on the basis of optically variable pigment (OVP), a preferred type of OVP being the flaky thin-film optical interference device described, e.g., in U.S. Pat. No. 4,705,300; U.S. Pat. No. 4,705,356; U.S. Pat. No. 4,721,217; U.S. Pat. No. 4,779,898; U.S. Pat. No. 4,930,866; U.S. Pat. No. 5,084,351, and in related disclosures. Other useful types of OVP comprise the multiply-coated particles described in U.S. Pat. No. 5,624,486 and U.S. Pat. No. 5,607,504.

Still another, useful type of optically variable pigments is obtained through the photo-polymerization of a thin film of cholesteric (i.e., chiral-nematic) liquid crystal material, followed by comminuting the polymer film into a pigment, such as described in U.S. Pat. No. 5,807,497 and U.S. Pat. No. 5,824,733. Said liquid crystal based (LC-) pigments have the additional property of reflecting, depending upon their internal chirality, selectively either right-handed or left-handed circularly polarized light, as disclosed, e.g., in EP 899,119 B1. As the LC-pigments can be made in either right- or left-handed chirality, the circular polarization sense of the reflected light from LC-pigment can be exploited to impart an additional, covert security feature to a document or article.

Still another type of optically variable devices can be realized on the basis of diffraction gratings, e.g., in the form of embossed holograms or similar devices carried on a metallized polymer foil, which is applied to a document or an article. Said embossed polymer foil can also be comminuted into a pigment and used as 'glitter' in a coating composition. In still another, somewhat less efficient way, a diffraction grating is embossed into preformed, pigment-size metal (e.g., aluminum) flakes. In all these embodiments, the required diffraction grating structure has a line spacing comparable with the wavelength of the diffracted light, i.e., typically of the order of 300-500 nanometers, corresponding to 2,000 or more lines per mm.

Optically variable pigments, inks and printed features, as well as optical diffraction devices, can be identified by assessing their spectral reflection properties for at least two different angles of view. Such information is commonly obtained in the laboratory with the help of a gonio-spectrometer (e.g., as manufactured by Zeiss), as described by R. Maisch and M. Weigand in "Perlglanzpigmente", 2nd edition, Die Bibliothek der Technik, Vol 56, Verlag Moderne Industrie AG, Landsberg/Lech, 1992 and in the cited references therein. A gonio-spectrometer allows to study a sample under any combination of illumination angle and spectral analysis angle.

In preferred technology, the detector cost is kept low by avoiding the use of spectrometers and adopting the sequential color-LED illumination technique disclosed in U.S. Pat. No. 4,204,765. This document describes a device for testing colored securities, such as paper having colored areas imprinted thereupon. A plurality of light emitting diodes (LEDs), each emitting light of a different wavelength range, sequentially illuminate a determined area on said paper, which is more or less reflective for the incident light. A single photodetector receives the light reflected by the paper and delivers an electric signal corresponding to the received light intensity. By comparison of the measured signals for the various LEDs with predefined reference values, an indicator of the authenticity of said paper is derived.

A system for the automated verification of optically variable features on value documents, bank notes, etc. has been disclosed in WO 01/54077. According to this disclosure, the optically variable feature is illuminated at least with a first and with a second light beam, and the light reflected from it is analyzed for at least a first and a second observation angle. The automated verification technology disclosed in WO 01/54077 has, however, a number of shortcomings that prevent, in particular, its practical implementation in low-cost automatic reader devices. A first shortcoming of the technology of WO 01/54077 is tied to the measurement geometry. The disclosed device illuminates the optically variable feature at predetermined incidence angles using directional light beams, and spectrally analyzes the light reflected from the illuminated feature at predetermined reflection angles related to said incidence angles. A second shortcoming is in the expensive nature of the components used. Two or more spectrometers are noteworthy required to analyze the light collected at two or more different angles of reflection. A third major shortcoming of the technology of WO 01/54077 is its lack of miniaturizeability.

US 2006/0204145 A1 describes a device for determining the authenticity of an item carrying a marking exhibiting a viewing-angle dependent light reflection spectrum, which is suitable for application in hand-held devices. The device requires at least two light sources having different spectral characteristics for providing illumination to the marking, wide-angle illumination optics for guiding the light of the light sources to the marking, at least two photodetectors with optional collection optics for collecting light reflected by the marking at least at two predefined different observation angles, and delivering an electric signal corresponding to the collected light intensity, analog-to-digital convertors, processors, controllers and memory, suitable for controlling the light sources, for digitizing and storing reflected intensity values, for comparing the intensity values with previously stored corresponding reference values, and for deriving an authenticity indicator from the comparison result, all according to a predefined algorithm, and using a pre-established decision criterion.

SUMMARY OF THE EMBODIMENTS OF THE DISCLOSURE

An aim of the disclosure is to improve upon the known systems for authenticating markings exhibiting a viewing-angle dependent light reflection spectrum by providing a simpler and less expensive concept that better lends itself to wide applicability.

This aim is solved by providing a hand-held device for authenticating a marking on an object, said marking exhibiting a viewing-angle dependent light reflection spectrum, said device comprising:

an imager for receiving light from said object and generating image data that include spectrum information,
a marking detector for detecting marking image data associated with said marking in said image data,
a parameter evaluator for determining a value of a predetermined spectrum parameter based on spectrum information of at least a part of said marking image data,
an angle estimator for determining a value of a viewing angle between said imager and said marking associated with a determined value of said spectrum parameter, and
an authenticator arranged for making an authentication decision based on at least two spectrum parameter values and their associated viewing angle values.

The aim is also solved by a method for authenticating a marking on an object with a hand-held device, said marking exhibiting a viewing-angle dependent light reflection spectrum, comprising:

using an imager in said hand-held device for receiving light from said object and generating image data that include spectrum information while changing a viewing angle between said imager and said marking,
detecting marking image data associated with said marking in said image data,
determining, based on spectrum information of at least a part of said marking image data, at least
a first value of a predetermined spectrum parameter at a first viewing angle, and
a second value of said predetermined spectrum parameter at a second viewing angle, and
making an authentication decision based on said at least two spectrum parameter values and their associated viewing angle values.

In accordance with the embodiments of the disclosure, an imager generating image data that include spectrum information is used, e.g., a digital color camera, instead of a complicated arrangement of sensors. Authentication of a marking exhibiting a viewing-angle dependent light reflection spectrum, e.g., a marking comprising optically variable ink (OVI), can be done using a device that comprises an individually operating imager, such as any device that contains a digital color camera, like a digital camera device or a mobile phone.

BRIEF DESCRIPTION OF THE DRAWINGS

Other advantages and features of the disclosure will become apparent from studying the detailed description of a few exemplary implementations and embodiments, which are no way limiting, and the appended drawings, in which.

DETAILED DESCRIPTION OF EMBODIMENTS OF THE DISCLOSURE

In the following, reference will be made to the Figures in describing various embodiments of the disclosure. This description serves to better understand the concept of the embodiments of the disclosure and points out certain preferable modifications of the general concept, but is in no way intended to be limiting, as the embodiments of the disclosure are defined by the appended claims.

Figure 1:
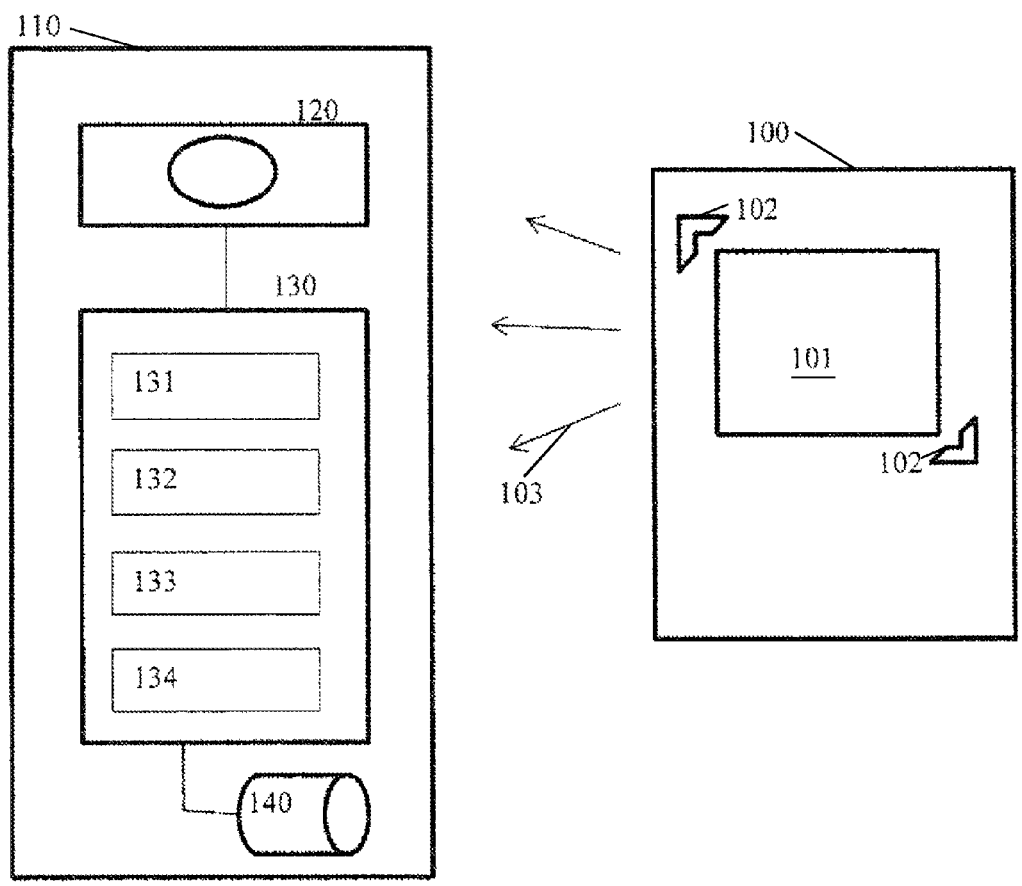
FIG. 1 shows an embodiment of the disclosure.

An embodiment of the disclosure is shown in FIG. 1, which schematically shows a hand-held device 110 arranged for authenticating a marking exhibiting a viewing-angle dependent light reflection spectrum, e.g., any of the types of markings described in the background section above. Reference numeral 110 relates to a hand-held device for authenticating an optically variable marking 101 on an object 100, e.g., on the packaging of a commercial product like a cigarette pack or beverage container. 'Hand-held' indicates that that the device 110 is suitable to be lifted and held in the hand by a user and that it can be freely manipulated in space with one hand.

Hand-held device 110 comprises an imager 120 for receiving light 103 from the object 100 and generating image data that include spectrum information. For example, the imager 120 may generate a set of pixels. The imager 120 may comprise a digital camera element for this purpose. The spectrum information can be provided in any suitable way that allows distinguishing different spectral responses of the marking 101, e.g., the spectral information can be amplitude or magnitude values in dependence on electromagnetic wavelength or frequency. However, as will be explained in more detail further on, the spectral information preferably relates to a color parameter, e.g., a color parameter based on any suitable standardized color space. In that case the disclosure has the advantage that a simple digital color camera element can be used, like e.g., the digital cameras employed in known consumer electronics like mobile telephones.

Although not shown in the figure, the hand-held device 110 of the disclosure will preferably also comprise a display that shows the image being received by the imager 120, so that a user can see what is being imaged, and can thus use the display for orienting the hand-held device 110 with respect to the object 100.

According to a preferred embodiment, the imager 120 is arranged for automatically generating a series of image frames while the device 110 and/or object 100 can be rotated in order to vary the viewing angle, e.g., by employing a video recording mode.

The device 110 furthermore comprises a marking detector 131 for detecting marking image data associated with the marking 101 in the image data provided by the imager 120, a parameter evaluator 132 for determining a value of a predetermined spectrum parameter based on spectrum information of at least a part of the marking image data, and an angle estimator 133 for determining a value of a viewing angle between the imager 120 and the marking 101 associated with a determined value of said spectrum parameter.

The marking detector 131 detects the marking 101 in the image data using any of known image processing techniques. For example, the marking 101 can be chosen to have one of a given number of predetermined shapes, and the marking detector is arranged to detect said predetermined shapes using image recognition, e.g., by performing edge detection and then performing a comparison of detected shapes against a database of reference shapes. Such a database may be stored within a memory of the device 110 or may also be provided outside of the device 110, or can be provided by a combination of memory inside and outside of the device 110. The marking detector 131 may be arranged to also employ further recognizable elements of the object 100 in this process, e.g. reference markings 102 specifically provided on said object 100 in predetermined relation to the marking 101, and/or the shape or outline of the object itself. As a result, the marking detector 131 can, e.g., identify a set of pixels in the image data as belonging to the marking 101.

The parameter evaluator 132 may be configured and arranged to evaluate any spectrum parameter suitable for distinguishing the different spectral responses of the marking 101. Preferably the spectrum parameter is a color parameter. The color parameter can be chosen in accordance with any of the known color spaces, like CIE (CIELUV, CIELAB, CIEUVW), RGB, YIQ, YUV, YDbDr, YPbPr, YCbCr, xvYCC, HSV, HSB, HSL or CMYK. One of the color bases from a given space can be chosen, e.g., the hue (H) of, for example, the HSV or HSL color spaces, but equally well also the saturation (S) or value (V), for example, of the HSV color space. Also, it is possible that the color parameter is determined by combining more than one base, e.g., by determining a color descriptor based on two or three bases, e.g., the hue (H) and saturation (S) of the HSV, HSB or HSL color spaces.

According to a preferred embodiment, the HSV color space is used. These values are obtained by a non-linear transformation of RGB values and attempt to decorrelate information of a particular color. Also, it has been proven that this color space is better suited to computer vision problems. Other color spaces of interest may include CIELab, which has as a main advantage, its perceptual uniformity: a notable difference in color (as noted by the human eye) is proportional to the Euclidean distance. Also, CIELab takes the illumination conditions into account.

The parameter evaluator 132 is arranged to evaluate at least a part of the marking image data. For example, if the marking detector 131 outputs a set of pixels that are identified as belonging to the marking 101, then the parameter evaluator 132 can process spectral information from all of these identified pixels or from a sub-set of these pixels. The processing of the marking image data taken into account (i.e., the whole set or the sub-set of pixels) can be done in any suitable or desirable way, e.g., the color parameter can be averaged over marking image data that is being taken into account. For example, the parameter evaluator 132 may be configured and arranged to determine the average hue (H) value from a sub-set of image pixels identified as being associated with the marking 101. Naturally, this is only an example, and other definitions of the color parameter may be used (e.g., the saturation, brightness, etc.), and equally other techniques than averaging are envisioned.

Figure 2:
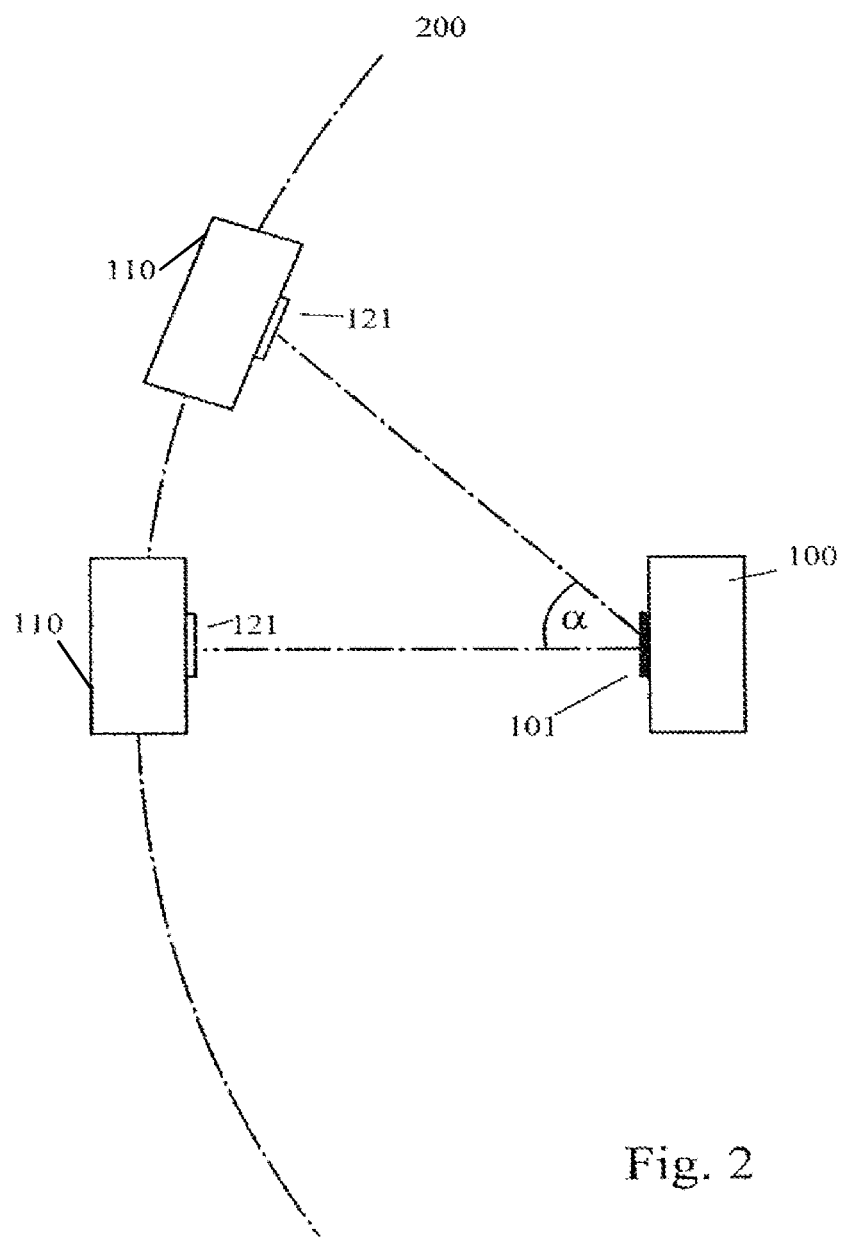
FIG. 2 shows a top view for explaining relative rotation of the hand-held device of the disclosure with reference to an object comprising a marking.

The angle estimator 133 is configured and arranged for estimating the viewing angle between the imager 120 or device 110 and the marking 101 being scrutinized. The viewing angle may be defined in any suitable or desirable way to indicate the angular relationship between the light 103 coming from the marking 101 and the position of the light input of the imager 120. FIG. 2 shows an example, where FIG. 2 is a top view of the object 100 and the hand-held device 110. The marking 101 is schematically indicated on the side of object 100 facing the device 110, and equally a light input element 121 (e.g., a lens) is schematically shown on the side of device 110 facing the object 100. In the figure, by rotating the hand-held device 110 with respect to the marking 101, e.g., along the curve 200, it is possible to change an angle α that can be used as describing the viewing angle of the marking 101. As the marking shows a viewing-angle dependent spectral response (e.g., a color shift that depends on the viewing angle), different values of α will lead to different values of the spectrum parameter.

Figure 3:
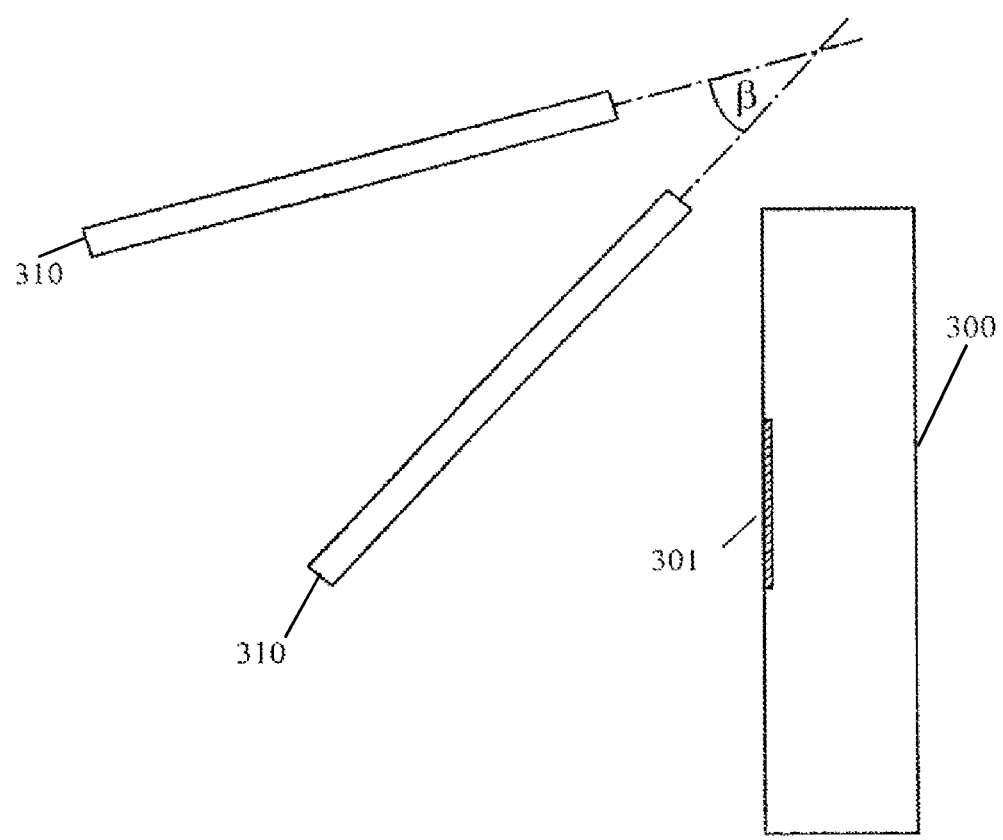
FIG. 3 shows another example of defining an angle usable as an indication of the viewing angle.

The viewing angle can also be described by an angle defined in an inverse configuration, i.e., by rotating the object 100 with respect to the hand-held device 110 in analog but inverse fashion to what is shown in FIG. 2. Furthermore, it is to be noted that FIG. 2 is only a schematic rendering, and the relative dimensions of the elements shown and their distances can be different. For example, FIG. 3 shows an embodiment where the hand-held device 310 is of similar size as the object 300, and the device can be held in close proximity to the object. For example, the hand-held device 310 could be a mobile phone and the object 300 a cigarette pack. In this example, the angle β as shown in the figure can also be used for describing the viewing angle of the marking 301.

The angle estimator 133 may be configured and arranged in any suitable or desirable way for estimating the viewing angle. For example, the angle estimator 133 may comprise one or more of a tilt-sensor, an accelerometer, and a gyroscopic device, as they are commonplace in game controllers and hand-held consumer electronic products like smart phones or tablet computers, and employ them in known manner to determine an angle change from a starting position. A starting angle of, e.g., α=0 in the example of FIG. 2 can be determined by instructing a user to initially arrange the device 110 with respect to the object 100 in such a way that the facing sides of device 110 and object 100 are parallel to one another. The user can furthermore be instructed to then move the device 110 (or alternatively the object 100) in order to vary the viewing angle, e.g., to move the device 110 to a final position in which the facing sides of the device 110 and object 100 are perpendicular to one another. Based on the output of one or more of the tilt-sensor, accelerometer, and gyroscopic device, the angle estimator 133 can then determine a viewing angle while the device 110 and/or object 100 is being relatively rotated, for one or more (preferably each) of the image frames being recorded by the imager 120 during the rotation.

According to a preferred embodiment, the angle estimator 133 is configured and arranged for determining an imaged aspect of a predetermined geometric reference structure on the object 100 and estimating the viewing angle based on the imaged aspect. Estimating a viewing angle based on image aspect is well known in the art, for example, by using four coplanar points, see, e.g., the article of Denis Oberkampf et al. "Iterative Pose Estimation Using Coplanar Feature Points", Computer Vision and Image Understanding, vol. 63, May, pp. 495-511, 1996. In this case a further detector for determining the geometric reference structure in the image data may be provided, or the marking detector 131 may be configured and arranged to also detect the geometric reference structure. Although this feature can be combined with the use of dedicated sensors like a tilt-sensor or the like, the particular advantage of this concept is that it can also be used to perform angle estimation only based on the image data generated by the imager, without the need for any further dedicated angle measurement devices. Hence, it helps to considerably simplify the implementation.

Figure 4:
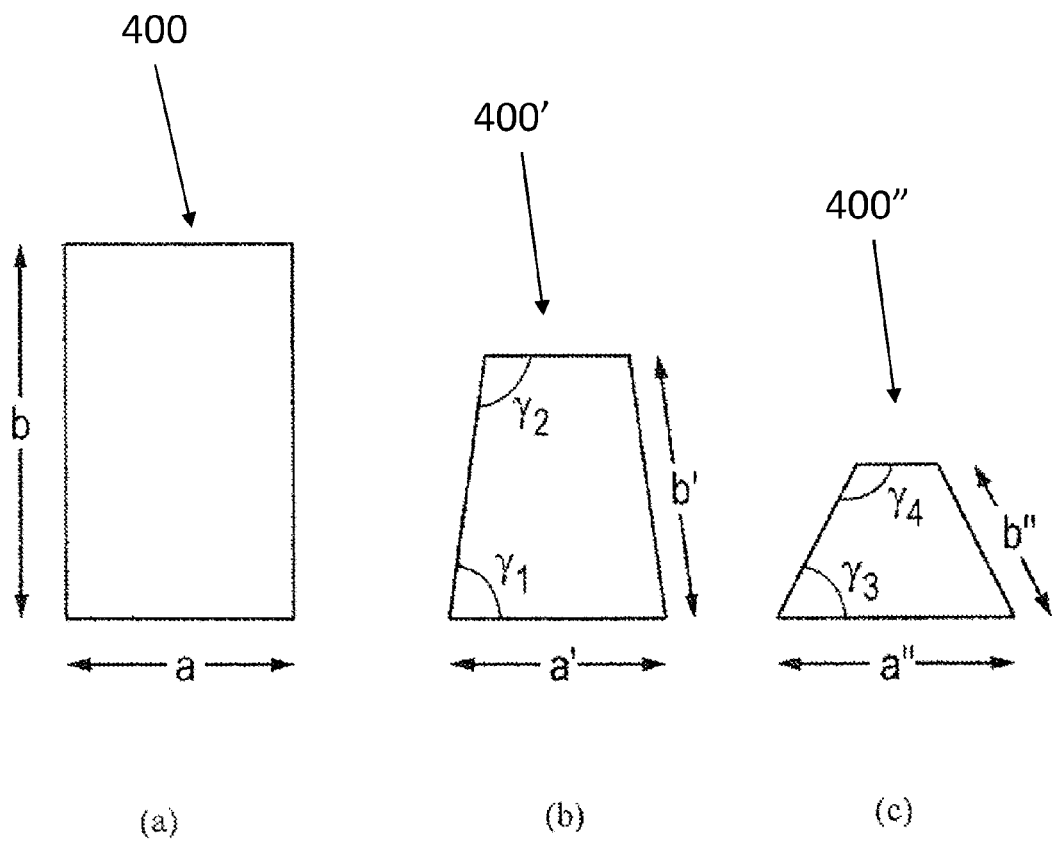
FIG. 4 is a diagram explaining an embodiment in which the angle is estimated based on the imaged aspect of a geometrical reference structure.

FIG. 4 shows an example of this embodiment. In the example, the geometric reference structure 400 on the object is a rectangle as shown in FIG. 4(*a*) with sides a and b connected by right angles. If the viewing angle is such that the side of device 110 with the imager and the side of the object 100 are in parallel, corresponding to an angle of a=0 in the example of FIG. 2, then the imaged aspect will correspond to the actual aspect in terms of the relationship between sides a and b and the angles in between, so that the image based angle estimator 133 can determine the viewing angle from the imaged aspect of the known geometric reference structure 400 by calculating the side relationships and angles from the imaged aspect and comparing with stored values of the geometric reference structure 400. FIGS. 4(*b*) and (*c*) schematically show the imaged aspect of the geometric reference structure 400', 400", respectively, at different viewing angles, where the angle estimator 133 can determine the viewing angle from the imaged aspect of the known geometric reference structure 400 using the known laws of geometry by calculating the side relationships between sides a', b' and angles γ1, γ2 from the imaged aspect of geometric reference structure 400' in FIG. 4(*b*) or the side relationships between sides a", b" and angles γ3, γ4 of geometric reference structure 400" in FIG. 4(*c*) and comparing with stored values of the geometric reference structure 400.

Naturally, the rectangle of FIG. 4 is only an example of a geometric reference structure 400, and in principle any reference structure with known dimensions and angles can be used.

The geometric reference structure 400 can be provided separately from the marking 101 on the object 100. According to a preferred example, the marking 101 comprises the predetermined geometric reference structure 400. For example, the geometric reference structure 400 can be the outline of the marking 101, or can be optically discernible within the area of the marking 101.

According to another example of the disclosure, the imager 120 is arranged for generating a series of image frames, and the angle estimator 133 is configured and arranged for determining values of the viewing angle in association with one or more of the image frames, preferably for each image frame. This can preferably be done by operating the imager 120 in a video mode, wherein the angle estimator 133 estimates the viewing angle, e.g., based on the imaged aspect of the geometric reference structure 400 for desired frames, so that for the desired frames, the parameter evaluator 132 generates a spectral parameter value and the angle estimator 133 provides in association therewith the viewing angle value, so that a measurement of spectral parameter value at associated viewing angle takes place.

Returning to the embodiment described in connection with FIG. 1, an authenticator 134 is configured and arranged for making an authentication decision based on at least two spectrum parameter values and their associated viewing angle values. The purpose of the authenticator 134 is to determine whether the measured spectrum parameter values correspond to a predetermined parametric model, in order to judge the marking 101 as authentic if one or more of the correspondence results are good enough, and/or to judge the marking 101 as inauthentic or false if not.

According to an embodiment, the authenticator is arranged for comparing at least two spectrum parameter values with one another, and making the authentication decision dependent on a result of said comparing. For example, if the authentic marking 101 is arranged to display a specific color difference between two angles, then the authenticator 134 can compare the measured two spectrum parameter values at the respective angles with one another and determine whether the comparison (e.g. by thresholding) reflects the known color difference or not. If the comparison reflects the known difference, then the marking 101 is judged authentic; if not, the marking 101 is judged inauthentic.

According to another embodiment, authenticator 134 is arranged for comparing at least one of the measured spectrum parameter values with a stored spectrum parameter reference model, in dependence on the associated viewing angle, and making the authentication decision dependent on a result of the comparing. For example, if the authentic marking 101 is arranged to display a specific color value at a specific viewing angle, then the authenticator 134 can compare a measured spectrum parameter value at that angle (or a value interpolated from measured values at different angle values) with the stored spectrum parameter reference model. If the values agree within a predetermined tolerance, then the marking 101 is judged authentic; if not, the marking 101 is judged inauthentic.

Preferably, the authenticator 134 not only compares one measured spectrum parameter value at a given angle with a stored spectrum parameter reference value, but determines a set or trace of spectrum parameter value measured at corresponding viewing angles with one or more reference traces or reference sets. This can be visualized as tracing the spectrum parameter values over the viewing angle in a diagram, and comparing the trace with one or more reference models associated with the marking 101 to be authenticated. If the measured set or trace agrees (within a predetermined tolerance) with one of the reference sets, then the marking 101 is judged authentic; if not, the marking 101 is judged inauthentic. Comparing a larger number of measured spectral parameter values with reference sets increases reliability of the authentication step, as the 'signature' (i.e., the specific characteristic of the spectrum parameter over the viewing angle) of the marking 101 over a range of viewing angle values can be more properly assessed.

In the following, an example will be given of determining a reference model to be used for comparison with measured spectrum parameter values. A training set corresponds to a set of pairs composed of the input variable (i.e., the viewing angle) and the associated value expected at the output, or target (i.e., the spectrum parameter value). To perform the learning phase, a so-called travel model for the characterization of the colour change can be learned. Representative examples of models are Support Vector Regression, Decision Trees, or Radial Basis Function (RBF). For illustration purposes, we present in more detail in the following a case of learning the mapping between the viewing angle and the spectrum parameter value (e.g., a colour value) using RBF.

An RBF network allows to approximate a function that relates the input to the output by defining basis function $\Phi_i$ and associated weights $w_i$. Mathematically, the function may be defined as:

$$\text{color}(\theta) = \phi_0 + \sum_{i=1}^{P} w_i \cdot \phi_i(\theta),$$

where 'color' represents the spectrum parameter value and $\theta$ represents the viewing angle. Using training pairs ($\theta_j$, color$_j$) as mentioned above, i.e., dedicated measurements of an authentic marking in a training process, the different parameters $\Phi_0$, $\Phi_i$ and $w_i$ of the model can be learned, and finally an approximation of the function color($\theta$) relating the viewing angle $\theta$ to the spectrum parameter 'color' can be defined. The function can then be stored as a reference model in the hand-held device 110 for comparison with measured spectrum parameter and viewing angle values during the authentication process.

The hand-held device 110 described above can be provided in any suitable or desirable way. The marking detector 131, parameter evaluator 132, angle estimator 133, and authenticator 134 can be provided as hardware, software or any suitable combination of hardware and software. In a preferred embodiment, marking detector 131, parameter evaluator 132, angle estimator 133, and authenticator 134 comprise or are fully embodied as computer program elements that are stored in a memory 140 of the device 110 and executable in a processor 130 of the device 110.

As a consequence, the disclosure can also be embodied as computer program code and/or a corresponding computer code product (such as a data carrier storing the computer code) for letting a hand-held device having an imager execute the process of:
  detecting marking image data associated with a marking in image data from the imager,
  determining, based on spectrum information of at least a part of said marking image data, at least
    a first value of a predetermined spectrum parameter at a first viewing angle, and
    a second value of said predetermined spectrum parameter at a second viewing angle, and
  making an authentication decision based on said at least two spectrum parameter values and their associated viewing angle values,
when loaded into and executed in a processor of the hand-held device.
For example, the disclosure can thus be embodied as an application or app to be loaded in a mobile computing device, such as a mobile telephone or tablet computer.

According to a further embodiment, the hand-held device 110 may be arranged to actively support the user of the device during the process of authenticating a marking 101 on an object 100 by automatically providing guidance and/or feedback to the user. According to an example, the hand-held device 110 comprises a display for displaying the image that is being received by the imager 120. The hand-held device 110 can be arranged such that as a preliminary step of the authentication process, a guide image is overlaid onto the image being received by the imager 120, in order to support the user in bringing the device 110 into an initial position at which the measurement of the spectrum parameter values should begin. Preferably, the guide image corresponds in shape to an element on the object 100 that is associated with the marking 101. For example, the guide image for overlay can be the outline of the marking 101, and/or the outline of some other printed element on the object 100 that stands in a predetermined relationship with the marking 101, such as the reference markings 102 described earlier in connection with FIG. 1. The guide image overlay can be arranged in such a way that when the guide image is brought into sufficient agreement on the display with the corresponding target element in the image data being generated by the imager 120, which is done by the user moving and orienting the device 110 and object 100 with respect to one another, the angular orientation and the distance between the device and object are in a range suitable for beginning a measurement. The user can then proceed to change the viewing angle in a predetermined way, in order to perform a measurement of spectrum parameter values as described previously, e.g., according to instructions given to the user separately or displayed to the user on the display of the device 110.

Due to the simplification that the embodiments of the present disclosure allow, the hand-held device 110 for authenticating a marking 101 can be provided using low-cost and standard electrical equipment, and can, for example, be provided in mass produced electronic devices that comprise digital camera elements, like in digital cameras, mobile digital assistants, mobile media players, mobile telephone devices, especially smart phones, or tablet computers.

The invention claimed is:
1. Hand-held device for authenticating a marking on an object, said marking exhibiting a viewing-angle dependent light reflection spectrum, said device comprising:
  an imager for receiving light from said object and generating image data that include spectrum information,
  a memory comprising computer program code,
  a processor,
  wherein the memory and the computer program code are configured, with the processor, to cause the hand-held device to:
  detect marking image data associated with said marking in said image data,
  determine a value of a predetermined spectrum parameter, which is a color parameter in a color space, based on spectrum information of at least a part of said marking image data,
  determine a value of a viewing angle between said imager and said marking associated with a determined value of said spectrum parameter, and
  make an authentication decision based on at least two spectrum parameter values and their associated viewing angle values.

2. The hand-held device of claim 1, wherein said imager comprises a camera.

3. The hand-held device of claim 1, wherein said hand-held device is a mobile telephone device.

4. The hand-held device of claim 1, wherein said predetermined spectrum parameter is hue (H) and the memory and the computer program code are configured, with the processor, to cause the hand-held device to determine a hue value.

5. The hand-held device of claim 1, wherein the memory and the computer program code are configured, with the processor, to cause the hand-held device to determine an average value from image data within at least a partial area of said marking.

6. The hand-held device of claim 1, wherein the hand-held device further comprises at least one of a tilt-sensor and an accelerometer.

7. The hand-held device of claim 1, wherein the memory and the computer program code are configured, with the processor, to cause the hand-held device to determine an imaged aspect of a predetermined geometric reference structure on said object and to estimate the viewing angle based on said imaged aspect.

8. The hand-held device of claim 7, wherein said marking comprises said predetermined geometric reference structure.

9. The hand-held device of claim 1, wherein the memory and the computer program code are configured, with the processor, to cause the hand-held device to compare said at least two spectrum parameter values with one another, and to make said authentication decision dependent on a result of said comparing.

10. The hand-held device of claim 1, wherein the memory and the computer program code are configured, with the processor, to cause the hand-held device to compare at least one of said spectrum parameter values with a stored spectrum parameter reference value, in dependence on the associated viewing angle, and to make said authentication decision dependent on a result of said comparing.

11. The hand-held device of claim 1, wherein the memory and the computer program code are configured, with the processor, to cause the hand-held device to compare a set of spectrum parameter values evaluated at different viewing angles with a set of stored spectrum parameter reference values, in dependence on the associated viewing angle, and to make said authentication decision dependent on a result of said comparing.

12. The hand-held device of claim 1, wherein said imager is configured for generating a series of image frames, and the memory and the computer program code are configured, with the processor, to cause the hand-held device to determine values of said viewing angle in association with one or more of said image frames.

13. A method for authenticating a marking on an object with a hand-held device, said marking exhibiting a viewing-angle dependent light reflection spectrum, the method comprising:
using an imager in said hand-held device for receiving light from said object and generating image data that include spectrum information while changing a viewing angle between said imager and said marking,
detecting marking image data associated with said marking in said image data,
determining, based on spectrum information of at least a part of said marking image data, at least:
a first value of a predetermined spectrum parameter at a first viewing angle, and
a second value of said predetermined spectrum parameter at a second viewing angle, wherein the spectrum parameter is a color parameter in a color space, and
making an authentication decision based on said at least first and second spectrum parameter values and their associated first and second viewing angles.

14. The method of claim 13, wherein the changing said viewing angle between said imager and said marking comprises rotating said hand-held device with respect to said object.

15. A computer code product comprising a non-transitory computer-readable medium comprising computer code parts executable by a processor to cause a hand-held device having an imager to perform a process of:
detecting marking image data associated with a marking in image data from the imager,
determining, based on spectrum information of at least a part of said marking image data, at least:
a first value of a predetermined spectrum parameter at a first viewing angle, and
a second value of said predetermined spectrum parameter at a second viewing angle, wherein the spectrum parameter is a color parameter in a color space, and
making an authentication decision based on said at least first and second spectrum parameter values and their associated first and second viewing angles.

16. A computer program stored on a non-transitory computer-readable medium comprising computer code parts executable by a processor to cause a hand-held device having an imager to perform a process of:
detecting marking image data associated with a marking in image data from the imager,
determining, based on spectrum information of at least a part of said marking image data, at least:
a first value of a predetermined spectrum parameter at a first viewing angle, and
a second value of said predetermined spectrum parameter at a second viewing angle, wherein the spectrum parameter is a color parameter in a color space, and
making an authentication decision based on said at least first and second spectrum parameter values and their associated first and second viewing angles.

* * * * *